United States Patent [19]

Khera

[11] Patent Number: 4,630,197
[45] Date of Patent: Dec. 16, 1986

[54] ANTI-MUTILATION CIRCUIT FOR PROTECTING DYNAMIC MEMORY

[75] Inventor: Muhammad I. Khera, Glendale, Ariz.

[73] Assignee: GTE Communication Systems Corporation, Phoenix, Ariz.

[21] Appl. No.: 597,625

[22] Filed: Apr. 6, 1984

[51] Int. Cl.[4] ............................. G06F 13/16
[52] U.S. Cl. ............................................ 364/200
[58] Field of Search ... 364/200 MS File, 900 MS File

[56] References Cited

U.S. PATENT DOCUMENTS

| 3,421,150 | 1/1969 | Quosig et al. ............ 364/200 |
| 3,921,145 | 11/1975 | Emm et al. ............... 364/200 |
| 4,096,571 | 6/1978 | Vander Mey ............. 364/200 |
| 4,096,572 | 6/1978 | Namimoto ................ 364/200 |
| 4,115,851 | 9/1978 | Nagano et al. ........... 364/200 |
| 4,130,864 | 12/1978 | Schlotterer ............... 364/200 |
| 4,189,766 | 2/1980 | Horiguchi et al. ....... 364/200 |
| 4,257,095 | 3/1981 | Nadir ....................... 364/200 |
| 4,314,335 | 2/1982 | Pezzi ........................ 364/200 |

Primary Examiner—Thomas M. Heckler
Attorney, Agent, or Firm—Frank J. Bogacz; Peter Xiarhos

[57] ABSTRACT

This circuit provides a scheme for protecting a common dynamic memory of a distributed processing system. This circuit protects against premature completion of a memory access cycle by a CPU for any of a number of fault conditions. As a result, common memory integrity is maintained despite a high number of memory accesses by a number of CPUs. This circuit operates in a simplex configuration or a duplicated redundant configuration.

10 Claims, 5 Drawing Figures

ANTI-MUTILATION CIRCUIT FOR PROTECTING DYNAMIC MEMORY

BACKGROUND OF THE INVENTION

The present invention pertains to circuitry for the protection of the contents of dynamic memory and more particularly to circuitry for preventing premature termination of a bus access cycle to dynamic memory by a central processing unit (CPU).

Computer control via central processing units (CPUs) of real time switching operations in modern telephone central offices is well known. In recently developed telephone central offices, the CPU control function has been provided by a number of small CPUs acting together. Such CPU arrangements are termed distributed processing systems.

In distributed processing systems, it is required that the CPUs interact directly with one another. In order for the CPUs of the distributed processing system to interact with one another, they must have communication via data transmission. One method of achieving this data transmission involves each CPU ceasing any other tasks which it may be performing; establishing a direct link via a predefined protocol scheme; and, transmitting the required data between one another.

A more efficient method for CPU communication involves asynchronously placing information in a predefined resource, such as memory, so that the CPU which is to receive the information may remove the information at a particular time convenient for it to do so which is shown in U.S. Pat. No. 4,376,975. This is typically accomplished through a common memory scheme in which a number of CPUs access one particular memory.

Dynamic RAM memory may be employed to fulfill the needs of a common writable/readable memory. These dynamic RAM memories are periodically maintained by means of a refresh signal supplied to the memory under control of the CPU. Noise on this refresh lead may provide destruction of the contents of the dynamic RAM memory. In a system where duplex memory units are employed, such as telephone central offices, destruction of both copies of the RAM memory may occur. This noise may occur when a CPU is prematurely removed from the bus before completing its memory access cycle. This type of problem may also be caused by a number of other faults, all of which will result in a central office outage. This outage may require a complete reload of millions of words of CPU instructions and data. This may take considerable time, such as 30 minutes.

Due to the public policy requirement of providing continuous 24-hour a day telephone service to subscribers, such central office outages of 30 minutes would be unacceptable.

SUMMARY OF THE INVENTION

An anti-mutilation circuit for protecting dynamic common memory in a distributed processing system includes a number of CPUs which provide an address and data for accessing the common memory. Each CPU operates asynchronously to generate a select signal which requests access to the common memory by that CPU.

Further included is an arbitration arrangement which is connected to each of the CPUs. The arbitration arrangement operates in response to the select signals of each of the number of CPUs to provide for controlling access to the common memory by granting one particular CPU access for each memory cycle. A memory interface circuit is connected between the arbitration arrangement and the common memory. The memory interface circuit operates in response to the one particular CPU request to control the access of the common memory.

The anti-mutilation circuit also includes a number of indicators. Each one of the indicators is connected to a corresponding CPU, to the memory interface circuit and to the arbitration arrangement. Each indicator operates in response to the select signal of each corresponding CPU and in response to the granting signal of the arbitration arrangement to generate a request signal, which indicates which particular CPU is to access the common memory.

Lastly, a storage apparatus is connected to the arbitration arrangement, to the indicators, to the memory interface circuit and to the common memory. The storage apparatus operates in response to the request signal of the particular CPU having common memory access control to retain both the address and data of that particular CPU for the duration of a complete memory access cycle.

DESCRIPTION OF THE PREFERRED EMBODIMENT

Figure 1:
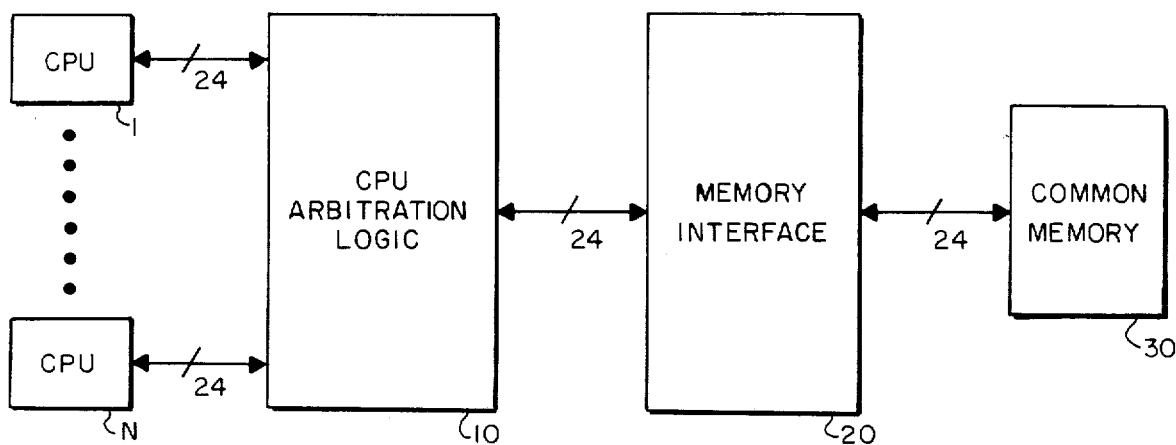
FIG. 1 is a block diagram of a memory access arrangement for a distributed processing system.

FIG. 1 is a block diagram of a memory access arrangement for a distributed processing system of a telephone central switching office. CPUs 1 through N are shown connected via 24-bit buses to CPU arbitration logic 10. CPU arbitration logic 10 is connected via a 24-bit bus to memory interface 20, which in turn is connected to common memory 30 via a 24-bit bus.

CPUs 1 through N may asynchronously generate read and write requests to common memory 30. As these requests are generated, a signal is transmitted via the 24-bit bus of each CPU to the CPU arbitration logic 10. The CPU arbitration logic 10 functions to determine which particular CPU is to be permitted to connect through memory interface 20 for accessing common memory 30. Arbitration logic 10 determines which particular CPU is to be granted control of the 24-bit bus to the memory interface 20 for the next memory cycle.

Various arbitration schemes may be employed as arbitration logic 10 to resolve contention problems between multiple CPUs for simultaneous or nearly simultaneous common memory access. One such arbitration scheme is a ring type structure as taught in U.S. Pat. No. 4,376,975, issued on March 15, 1983, pertaining to the GTD-5 EAX, a product of GTE Communication Systems Corporation. U.S. Pat. No. 4,376,975 is assigned to the same assignee as the present invention, which also pertains to the GTD-5 EAX. Regardless of the type of arbitration logic chosen, one and only one CPU is granted access to the 24-bit bus connecting arbitration logic 10 to memory interface 20.

Once the arbitration logic 10 grants the memory interface bus to a particular CPU, memory interface 20 then controls the access (read or write) of common memory 30. Once the connection of the particular CPU to memory 30 is established, this CPU then transmits the memory address to be accessed and the appropriate data, if the operation is a memory write; or, the CPU waits for data at the appropriate time, if the operation is a memory read. The number of processors which may be included in this scheme is limited only by the number of physical connections that may be made on individual circuit wiring cards. Requirements for the present system indicate that the number N of FIG. 1 may be substantially in the range of from 2 to 96 CPUs.

Figure 2:
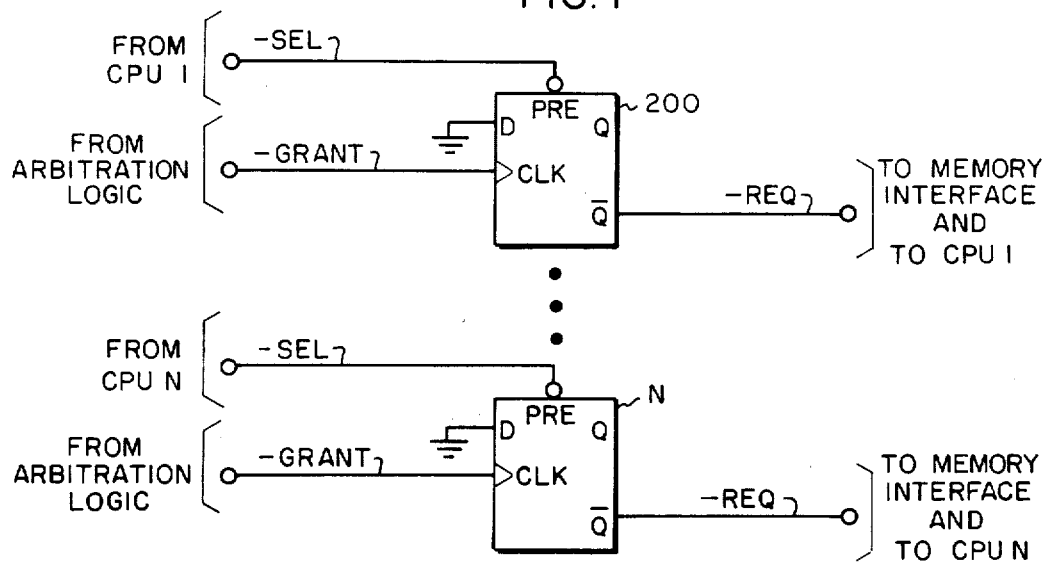
FIG. 2 is a schematic diagram of a control portion of the embodiment of the present invention.

Each CPU is connected to a corresponding D-type flip-flop 200 through N which is shown in FIG. 2. Flip-flop 200 is connected to CPU 1 with each successive CPU being connected to another flip-flop so that, flip-flop N is connected to CPU N. When a CPU requests a memory access the −SEL lead goes to logic 0 (see FIG. 5). A number of CPUs may simultaneously request memory access and thereby, indicate the condition on the −SEL lead of the CPU's respective flip-flop.

According to the arbitration scheme of the arbitration logic, one and only one CPU will be granted access to the common memory. In response to the arbitration logic, one of the flip-flops 200 through N will receive the −GRANT signal from the arbitration logic. This signal is connected to the clock input of the flip-flop 200 through N. The pre-set lead of each flip-flop 200 through N, indicates the identity of the requesting CPU. The Q output of the flip-flop corresponding to the requesting CPU will go to the logic 0 state, generating the signal on the −REQ lead. The −REQ lead is connected to the memory interface 20 of FIG. 1 and back to the requesting CPU as an acknowledge signal. See FIG. 5 for the timing of the −SEL, −REQ and −GRANT signals.

The bus connecting CPU arbitration logic 10 to memory interface 20 is a 24-bit bus. This bus includes 18 bits of address and data information, which is time multiplexed on the bus, control information bits and parity bits. Therefore, the address and data information appears on the bus only for a short time during the memory access cycle.

Figure 3:
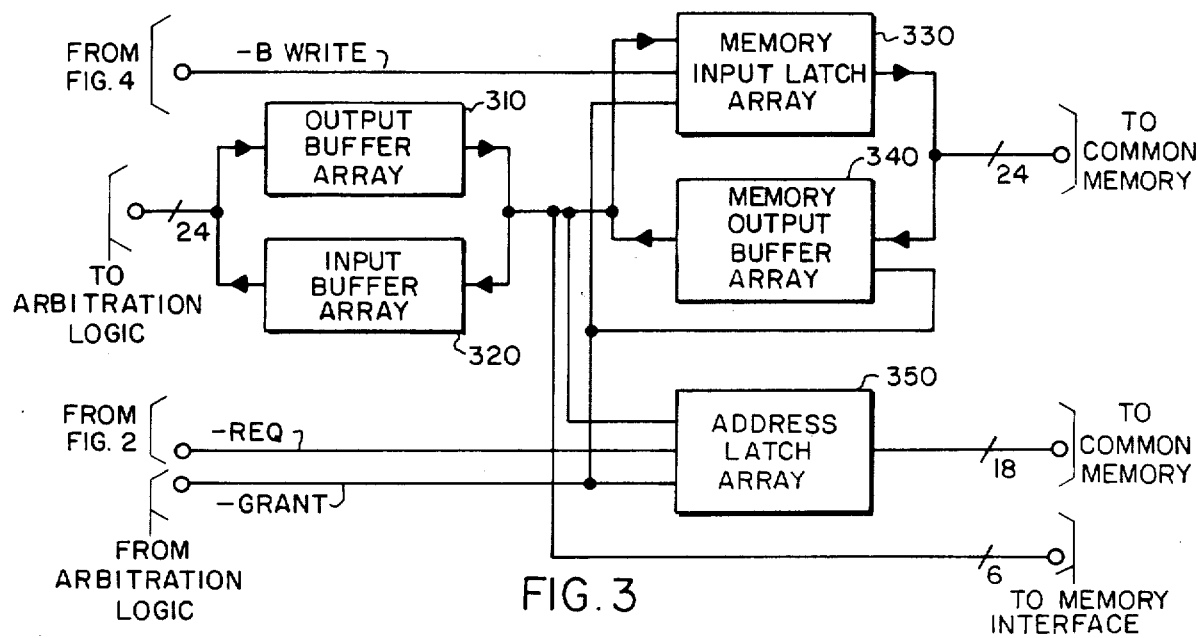
FIG. 3 is a schematic diagram of a bus buffering arrangement portion of the embodiment of the present invention.

Referring to FIG. 3, an output buffer array 310 and an input buffer array 320 are shown connected to the 24-bit bus which is connected to the arbitration logic. The output buffer array 310 transmits all data and address information from a particular CPU, which is connected through the arbitration logic, to the common memory. The input buffer array 320 stores and forwards data from the common memory through the arbitration logic to the particular CPU, which is connected to the arbitration logic.

Figure 5:
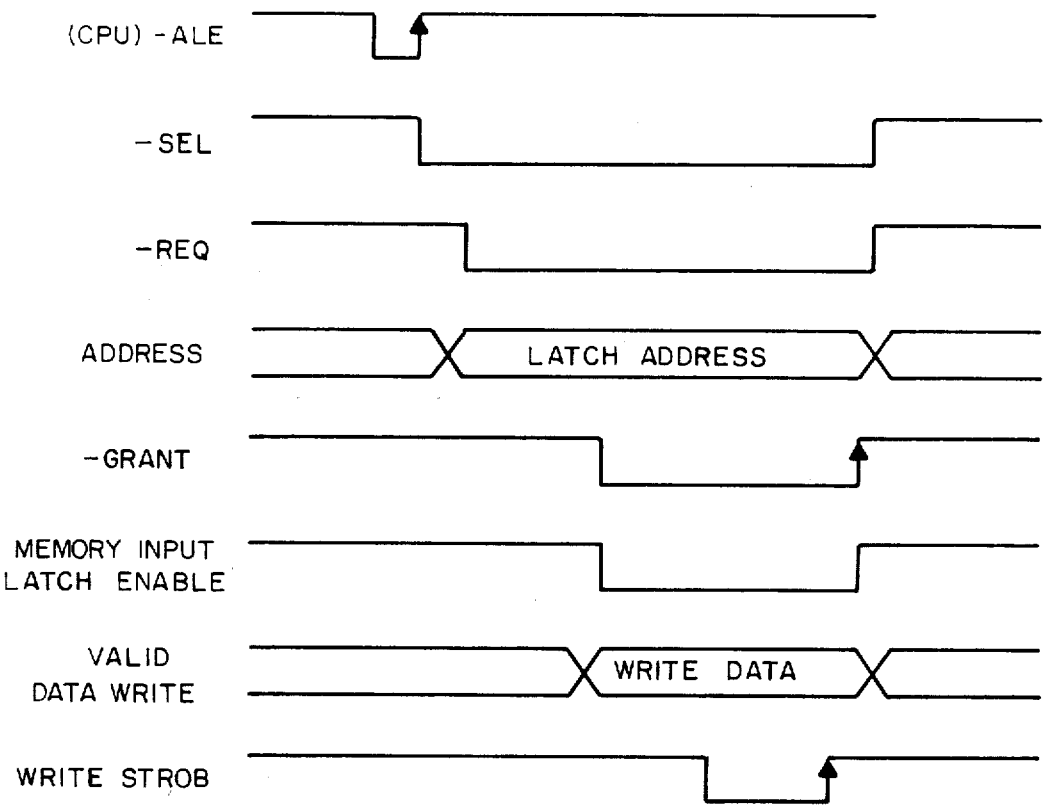
FIG. 5 is a timing diagram depicting various signals associated with a memory access.

The memory address is transmitted on this bus before the data (see FIG. 5). The value of the memory address is temporarily stored in output buffer array 310 for a write memory access. The 6-bit control portion of the output bus of output buffer array 310 is connected to the memory interface. In order to hold the memory access, so that a premature removal of the CPU from the bus will not cause memory mutilation, the address of the memory location to be accessed is stored for the duration of the memory cycle an address latch array 350. Address latch array 350 is connected to the common memory for the transmission of the address and receives the address from output buffer array 350. The −GRANT signal from the arbitration logic and the −REQ signal from the particular flip-flop of FIG. 2, which corresponds to the CPU which was granted access to the memory, enable the address to be latched in the address latch array 350. The leading edge of the −REQ signal triggers the latching of the address by address latch array 350.

At the time in the CPU memory write cycle after the −GRANT signal has been generated, the data to be written in memory is valid as shown by the valid data write signal of FIG. 5. Just as in the case of the address, data may be mutilated if the CPU prematurely terminates the write cycle. Memory input latch array 330 is triggered by the signal of the −BWRITE lead to latch the data to be written in memory. Also enabling memory input latch array 330 is the −GRANT signal from the arbitration logic. As a result, the address of the memory location to be written is stored in address latch array 350 and the data to be written at that address is stored in the memory input latch array 330.

For any fault condition which would cause the connected CPU to be removed from the bus, the memory interface may still complete the access of the common memory because the data and address of the memory location to be written or read are stored until the −GRANT signal is removed by the arbitration logic. This removal of the −GRANT signal indicates the end of a memory access cycle. The removal of the −GRANT signal is not dependent upon the CPU but, is instead dependent upon the arbitration logic. Therefore, premature removal of the CPU from the bus will not cause any memory mutilation for the memory write access.

For a memory read operation the access is similar to that described for the write operation above. The address latch array 350 will be operated in response to the −REQ signal to latch the address of the memory location to be read. The data which is to be read from memory will be temporarily stored in memory output buffer array 340 which is connected to the common memory. Memory output buffer 340 is also operated in response to the −GRANT signal from the arbitration logic. Memory output buffer array 340 is connected to input buffer array 320. Memory input buffer array 320 provides for temporarily storing and forwarding the data read from memory. Input buffer array 320 is connected via the 24-bit bus through the arbitration logic to the particular CPU, which has performed the memory read operation. Similar to the operation of a memory write access as described above, memory read access also provides for holding the data and address for the completion of the memory read cycle to prevent any possible mutilation of data.

Figure 4:
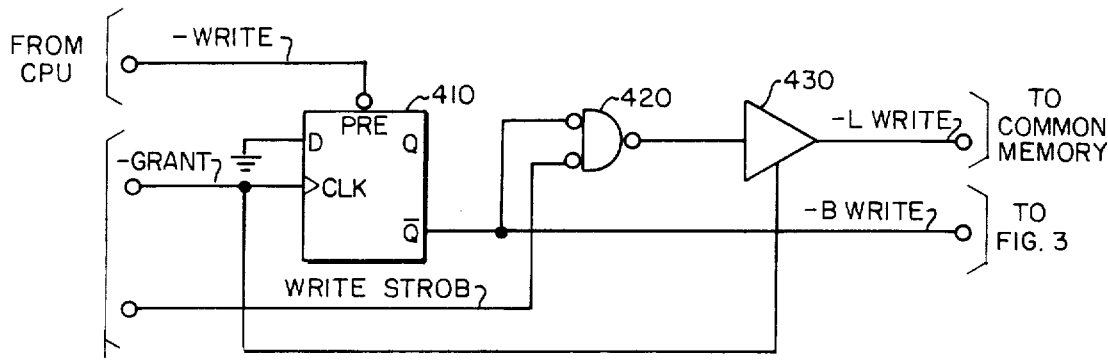
FIG. 4 is a further portion of the control arrangement of the embodiment of the present invention.

Turning now to FIG. 4, a circuit for manipulating the control signals for a memory write operation is shown. The −WRITE lead of the particular CPU connected through the arbitration logic is connected to the pre-set input of the D-type flip-flop 410. The −GRANT lead of the arbitration logic is connected to the clock input of flip-flop 410 to provide for enabling the flip-flop. In response to the −GRANT signal, flip-flop 410 generates a −BWRITE signal on the Q output of flip-flop 410. The −BWRITE lead is connected to and enables memory input latch array 330 shown in FIG. 3. The —BWRITE signal operates to save the data to be written into the common memory in memory input latch array 330. A signal is transmitted on the write STROB lead from the arbitration logic to NAND gate 420, where it is combined with the signal on the —BWRITE lead to produce the —LWRITE signal for controlling the write operation of the common memory. The output of NAND gate 420 is connected to gate 430 which is enabled by the signal on the —GRANT lead to transmit the —LWRITE signal to the common memory. Refer to FIG. 5 for the timing of the write STROB signal.

At the end of a memory access cycle, the arbitration logic resets the —GRANT signal and thereby clears the particular flip-flop of FIG. 2, which corresponds to the CPU which was granted access to the common memory. In addition, the —GRANT signal resets the memory input latch array 330, the memory output buffer array 340, the address latch array 350 all of FIG. 3 and flip-flop 410 which controls the generation of the memory write signals.

Although a simplex version of the present invention is shown, it is to be understood that duplex circuitry is typically employed in operations such as telephone switching offices, which require high reliability. In view of this, a duplex arrangement is well within the scope of the present invention. One such duplex scheme for multiple CPUs accessing duplicated common memory is shown in U.S. Pat. No. 4,363,096, issued on Dec. 7, 1982, relating to the GTD-5 EAX to which the present invention also pertains. The present invention is assigned to the same assignee as the aforementioned patent. This patent teaches duplex memory access in a distributed processing arrangement.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An anti-mutilation circuit for protecting dynamic common memory for a memory access cycle in a distributed processing system comprising:
   a plurality of CPU means each providing address and data for accessing said common memory and each said CPU means operating to asynchronously generate a select signal for requesting access to said common memory;
   arbitration means connected to each of said plurality of CPU means, said arbitration means being operated in response to a plurality of said select signals to provide a signal granting access of said common memory to one particular CPU means;
   memory interface means connected between said arbitration means and said common memory and being operated to control said access of said common memory by said one particular CPU means;
   a plurality of request indicating means, each said request indicating means connected to a corresponding CPU means, to said memory interface means and to said arbitration means, each said request indicating means being operated in response to said select signal of said corresponding CPU means and in response to said access granting signal of said arbitration means to generate a request signal indicating which particular CPU means is to access said common memory; and
   storage means connected to said arbitration means, to said plurality of request indicating means, to said memory interface means and to said common memory, said storage means being operated in response to one said request signal to retain said address and data of said one particular CPU means for said common memory access cycle.

2. An anti-mutilation circuit as claimed in claim 1, wherein said storage means includes:
   memory buffer input means connected to said arbitration means, to said common memory and to said memory interface means, said memory buffer input means being operated in response to said request signal of said one particular CPU means to buffer and to store said data to be written into said common memory for said complete memory access cycle; and
   memory buffer output means connected to said arbitration means, to said common memory and to said memory interface means, said memory buffer output means being operated in response to said request signal of said one particular CPU means to buffer and to store said data to be read from said common memory for said complete memory access cycle.

3. An anti-mutilation circuit as claimed in claim 2, wherein said memory buffer input means includes:
   output buffer array means connected to said arbitration means and being operated to temporarily store and forward said address and data of said one CPU means; and
   memory input latch means connected to said common memory and to said output buffer array means, said memory input latch means being operated in response to said access grant signal to store said data of said output buffer array means.

4. An anti-mutilation circuit as claimed in claim 3, wherein said storage means further includes write control means, said write control means including:
   flip-flop means connected to said particular CPU means and to said arbitration means, said flip-flop means being operated in response to said access grant signal to generate a write control signal for operating said memory input latch means;
   first gating means connected to said flip-flop means and to said arbitration means, said first gating means being operated in response to a write strobe signal of said arbitration means to produce a common memory write control signal; and
   second gating means connected to said common memory, to said first gating means and to said arbitration means, said second gating means being operated in response to said access grant signal to transmit said common memory control write signal to said common memory.

5. An anti-mutilation circuit as claimed in claim 4, wherein said flip-flop means of said write control means includes at least one D-type flip-flop.

6. An anti-mutilation circuit as claimed in claim 4, wherein said first gating means includes at least one NAND gate.

7. An anti-mutilation circuit as claimed in claim 3, wherein said storage means further includes address latch array means connected to said request indicating means, to said arbitration means, to said output buffer array means and to said common memory, said address latch array means being operated in response to said access grant signal to store said common memory address.

8. An anti-mutilation circuit as claimed in claim 2, wherein said memory buffer output means includes:
   output buffer array means connected to said common memory and being operated to temporarily store said data to be read by said one particular CPU means; and
   input buffer array means connected to said output buffer array means and to said particular CPU means through said arbitration means and said input buffer array means being operated to temporarily store and forward said data of said output buffer means to said CPU means.

9. An anti-mutilation circuit as claimed in claim 1, wherein each of said plurality of request indicating means includes flip-flop means connected to said arbitration means, to said memory interface means and to said corresponding CPU means, said flip-flop means being operated to transmit said generated request signal to said memory interface means and to said corresponding CPU means to indicate acknowledgment of said select signal.

10. An anti-mutilation circuit as claimed in claim 9, wherein said flip-flop means of said indicating means includes a plurality of D-type flip-flops.

* * * * *